Aug. 15, 1950     F. W. BLANCHARD ET AL     2,518,594
INJECTION MOLDING MACHINE AND METHOD
Filed July 19, 1945     8 Sheets-Sheet 1
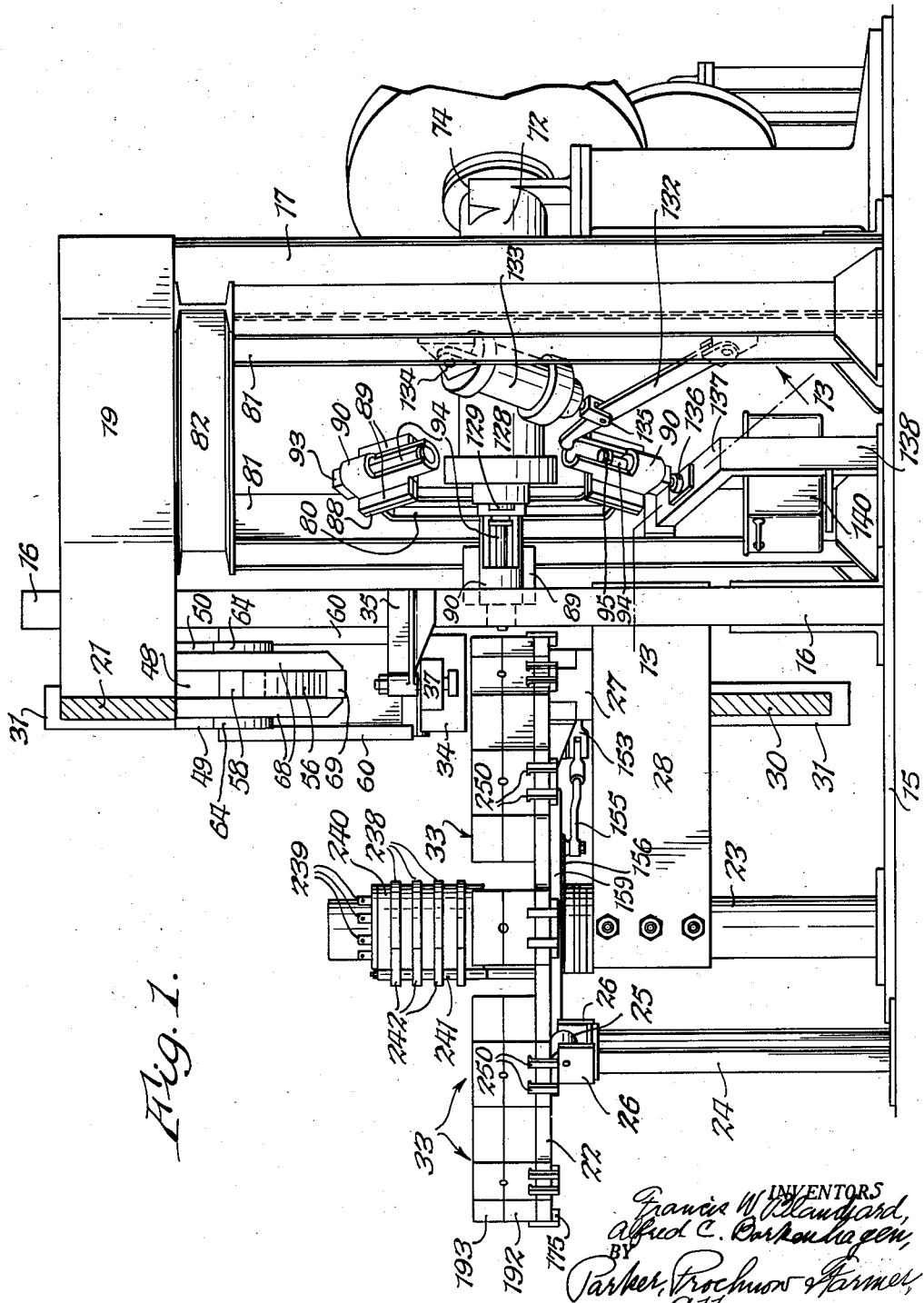

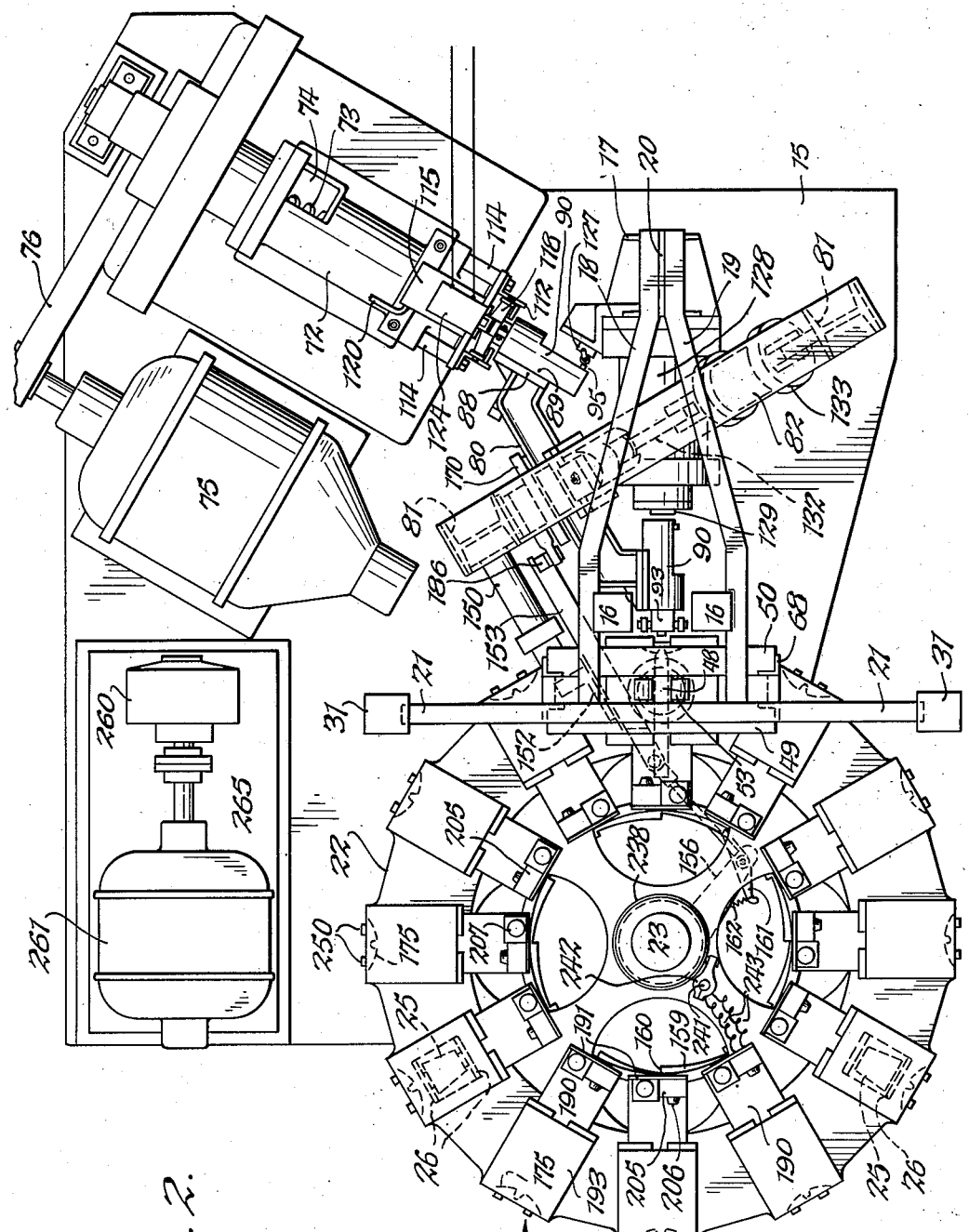

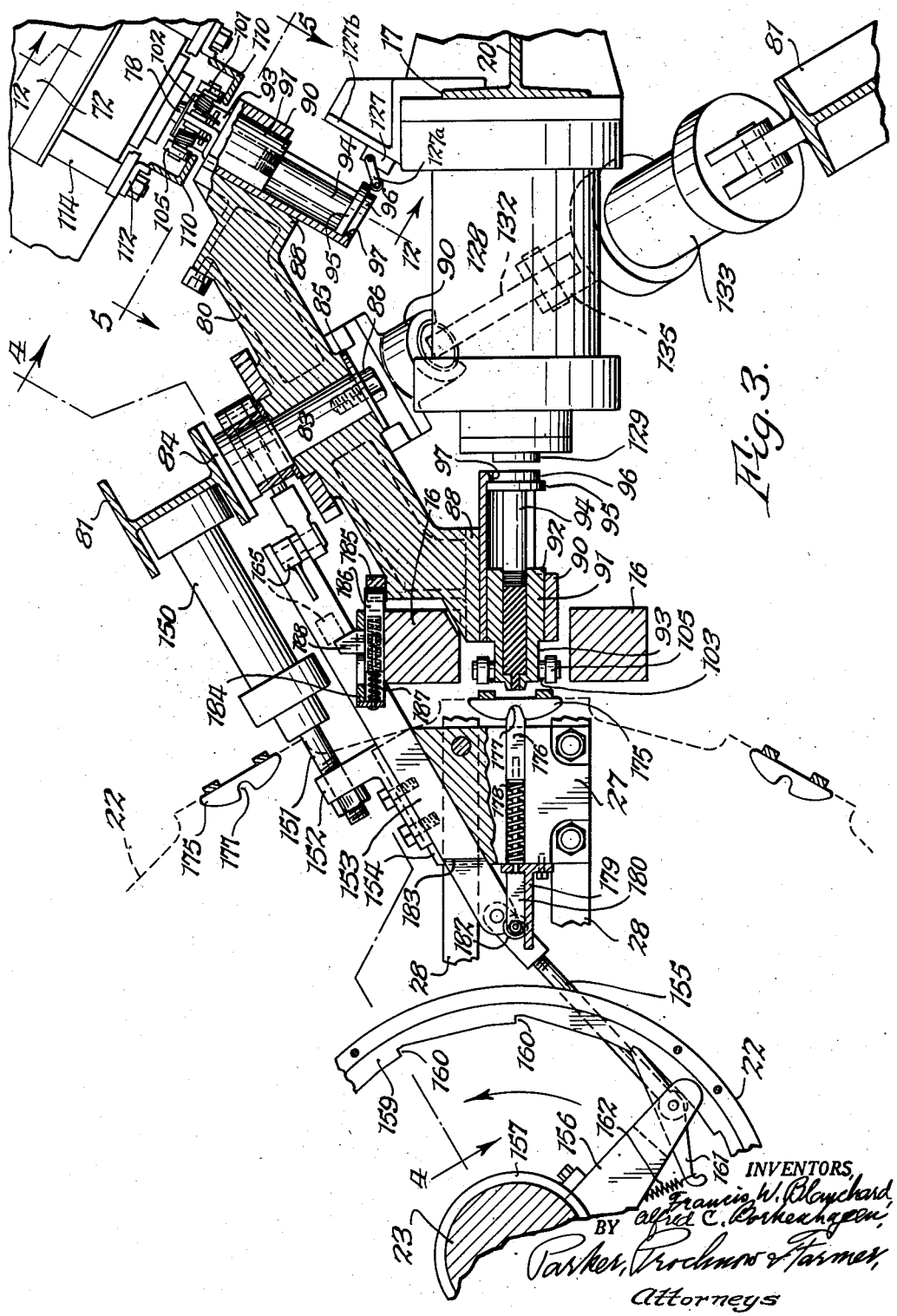

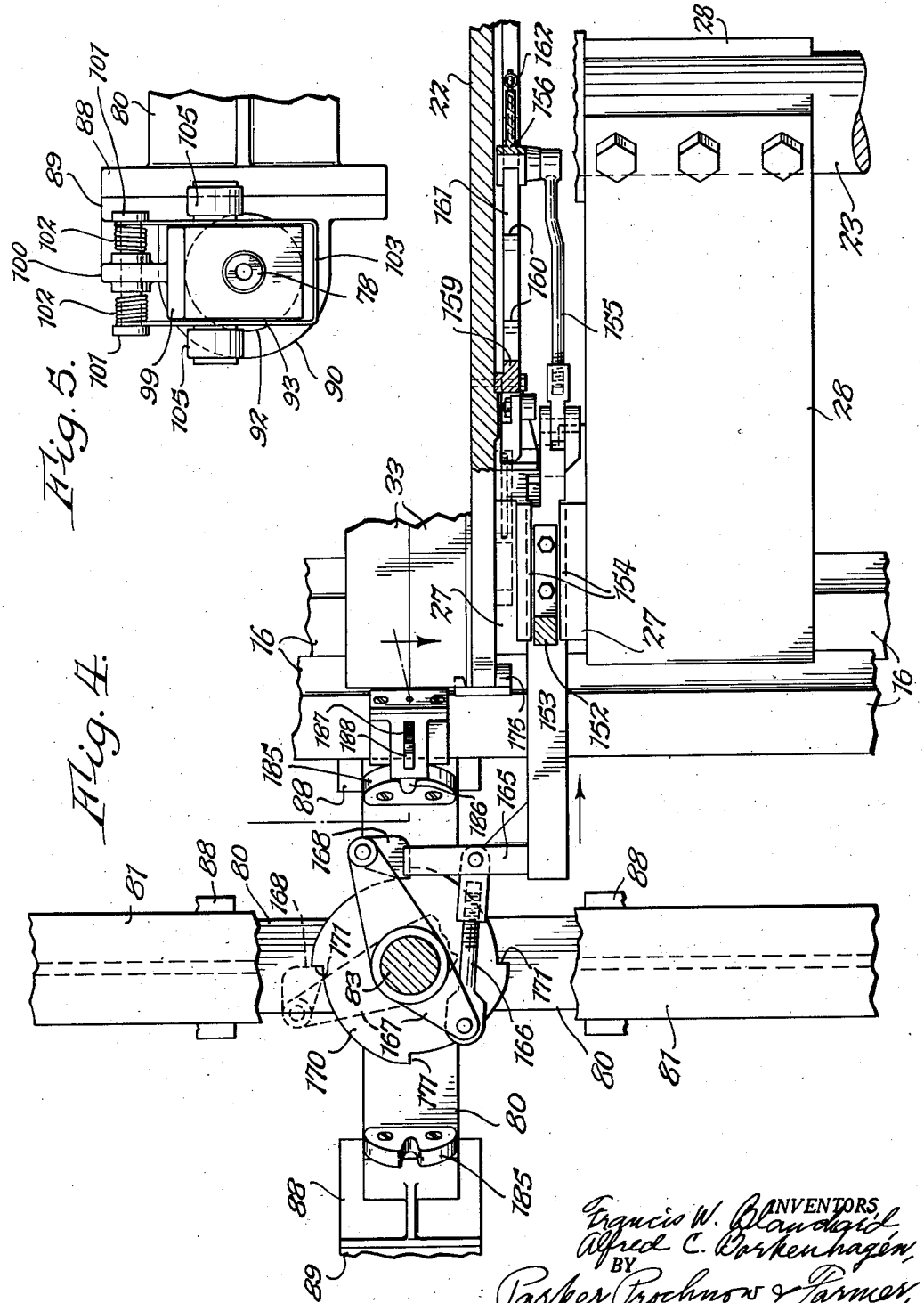

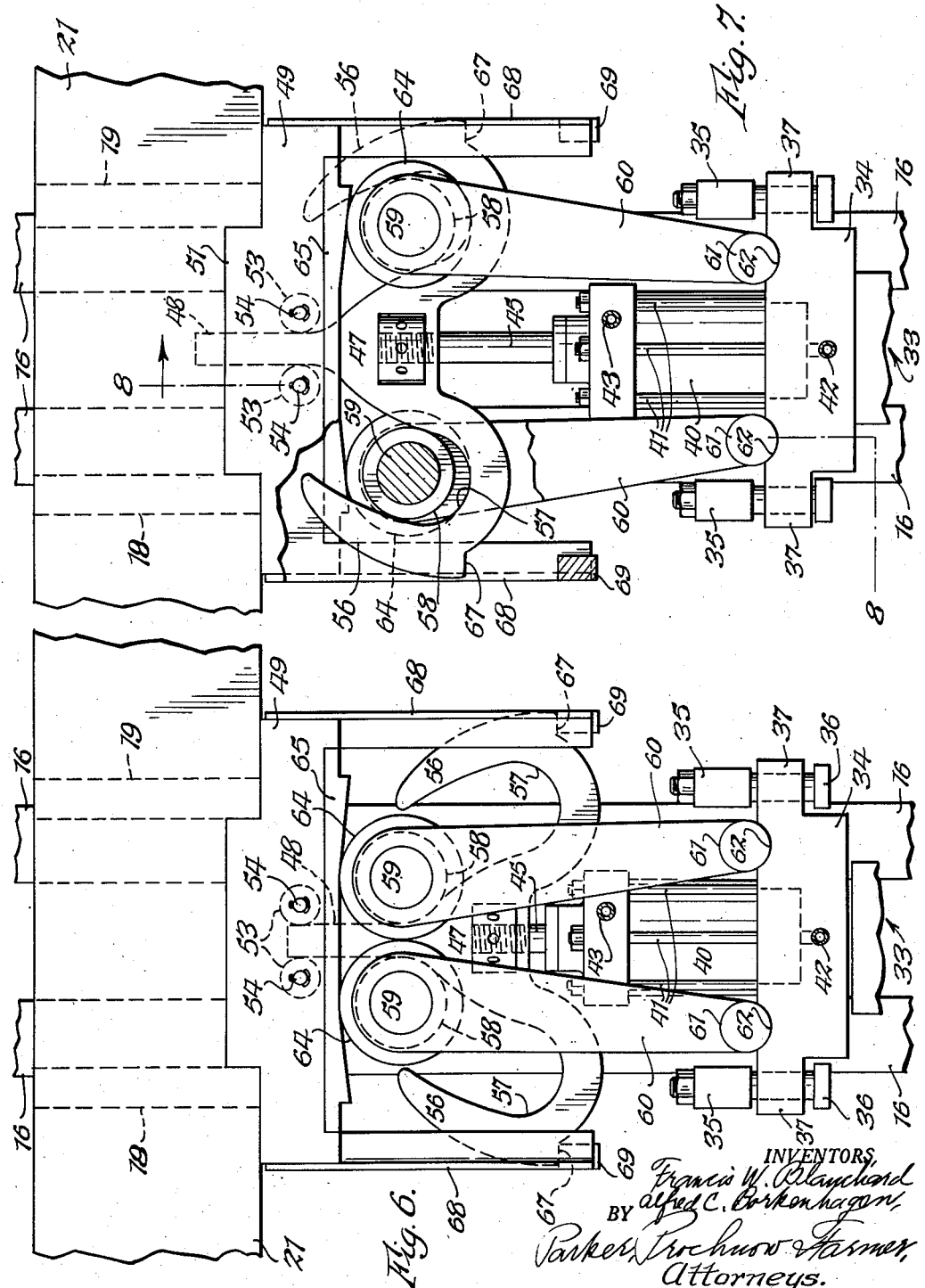

Aug. 15, 1950   F. W. BLANCHARD ET AL   2,518,594
INJECTION MOLDING MACHINE AND METHOD
Filed July 19, 1945   8 Sheets-Sheet 6
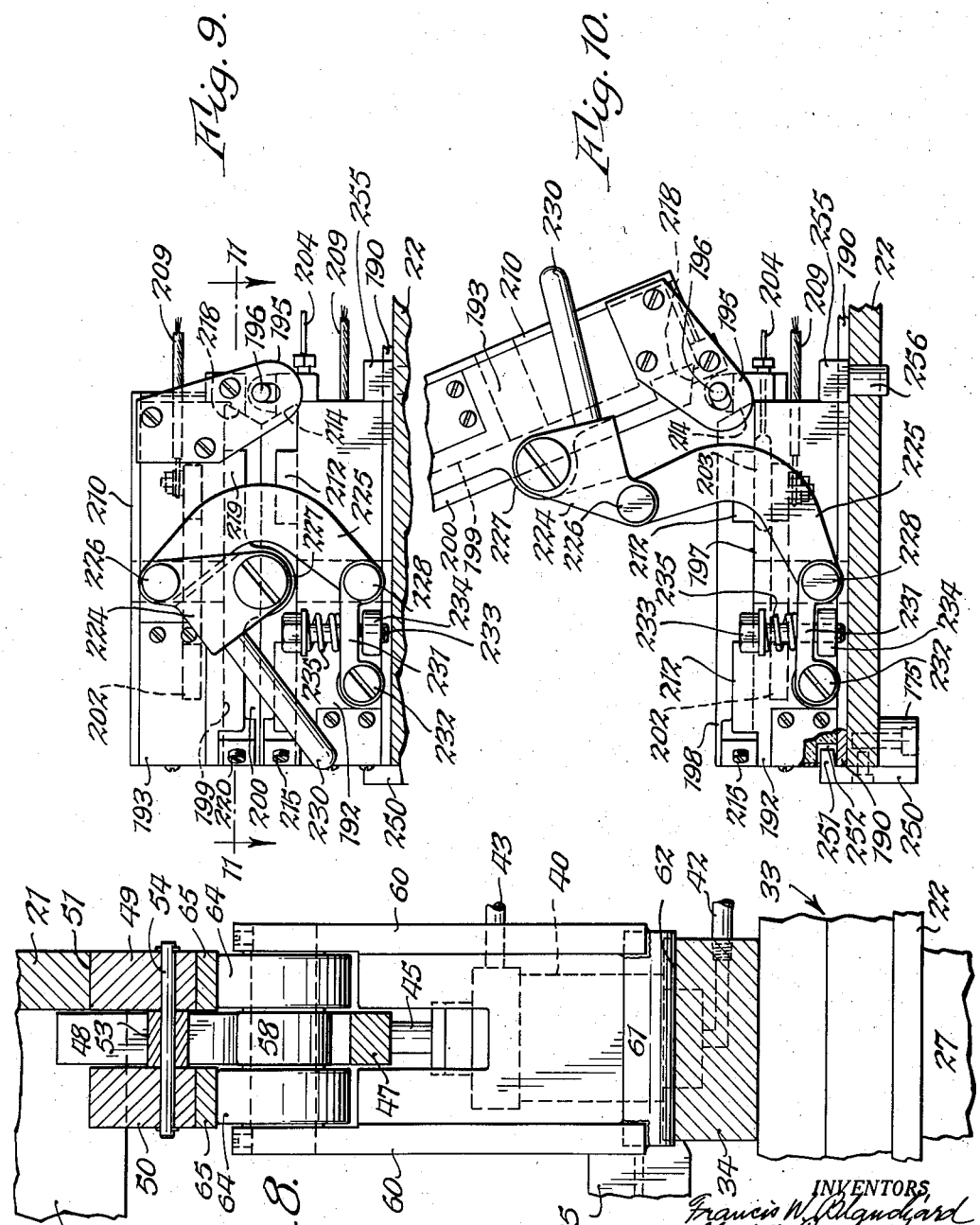

Aug. 15, 1950   F. W. BLANCHARD ET AL   2,518,594
INJECTION MOLDING MACHINE AND METHOD
Filed July 19, 1945   8 Sheets-Sheet 7
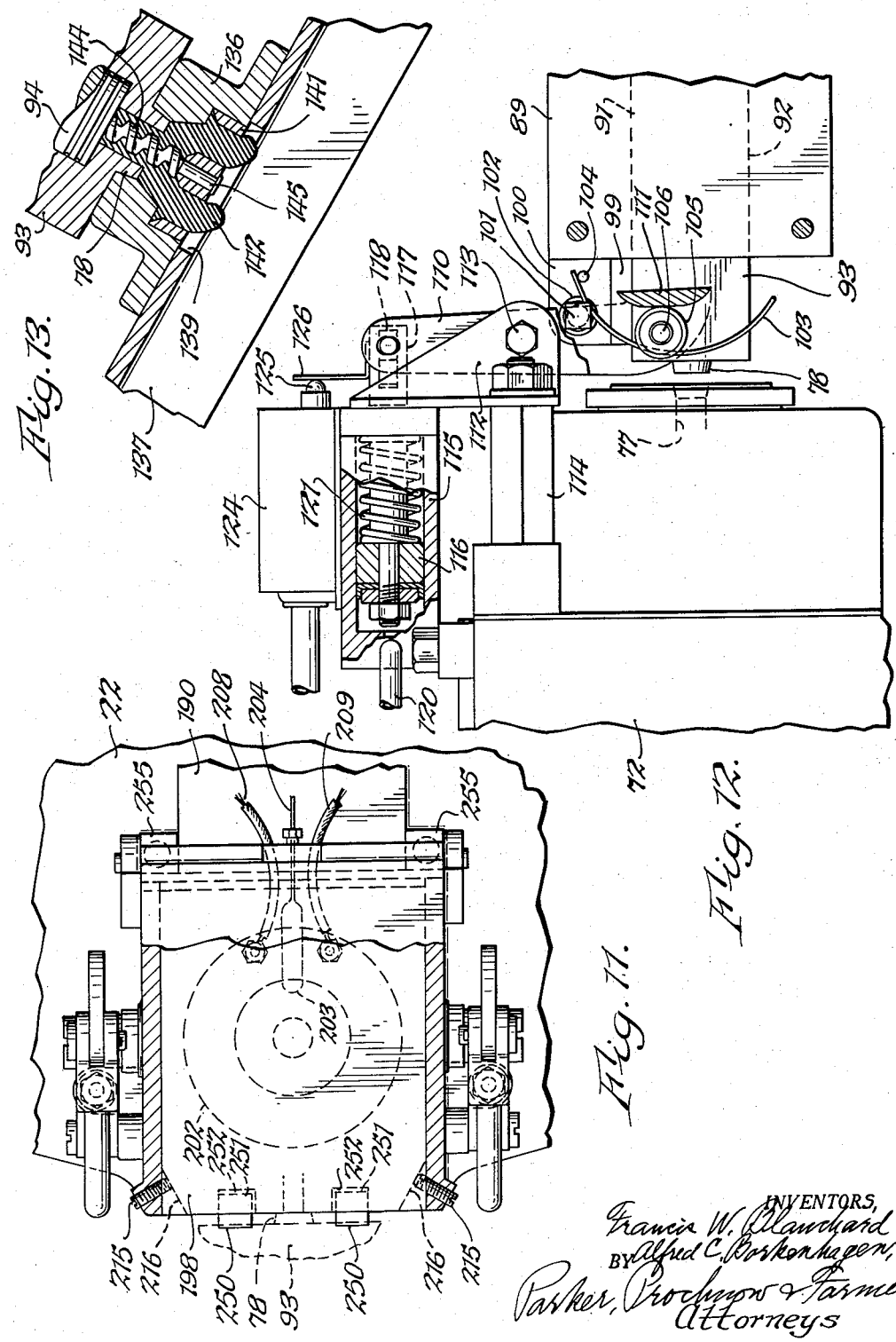

Aug. 15, 1950   F. W. BLANCHARD ET AL   2,518,594
INJECTION MOLDING MACHINE AND METHOD
Filed July 19, 1945   8 Sheets-Sheet 8

Patented Aug. 15, 1950

2,518,594

UNITED STATES PATENT OFFICE 2,518,594

INJECTION MOLDING MACHINE AND METHOD

Francis W. Blanchard, Snyder, and Alfred C. Borkenhagen, Buffalo, N. Y., assignors to Hewitt Rubber Corporation, Buffalo, N. Y.

Application July 19, 1945, Serial No. 605,906

35 Claims. (Cl. 18—30)

This invention relates to injection molding machines and methods for molding articles from plastic materials.

One of the objects of this invention is to provide a machine of this type with means of improved construction for feeding charges of plastic material to the molds. Another object is to provide an improved method and apparatus for handling mill stock of rubber or a rubber-like composition, conditioning the same for molding and molding the same before a film can form thereon, to produce homogeneous molded parts. A further object is to provide a method and apparatus of this type which is capable of operating at a high rate of production. It is also an object to treat mill stock and forming molded articles therefrom in such manner as to minimize stock knitting trouble, to prevent contamination of the stock by air and foreign material and to eliminate air bubbles.

Another object of this invention is to provide a molding machine by means of which the material to be molded may be dispensed to the molds in measured quantities. A further object is to discharge from a dispensing device to a temporary holder a sufficient quantity of material to form a charge for a single mold, and then forcing such charge from a holder into the mold. It is also an object to provide means for removing from the holder any material left after charging the mold, so that a complete fresh charge may again be admitted to the holder from the dispensing device.

It is also an object of this invention to provide improved means whereby a charge holder may be moved into and held in charge receiving position relatively to the dispensing device for the material. A further object is to provide carrying means for moving the charge holders from the dispensing device into operative relation to a mold.

It is also an object to provide a machine of this kind with mold housings of improved construction having removable molds or dies, so that the mold housings can readily be adapted for producing different types of molded articles. A further object is to provide improved means for securely holding the parts of the mold in correct relation to each other during molding. A further object is to provide mold housings which can be supplied with means for heating the molds when operating on materials which require heat for curing the same after molding. Another object is to provide a mold housing with means of improved construction for securely clamping the two parts of the mold housing together and for readily separating the same for removal of the molded articles.

Another object is to provide mechanism of improved construction by means of which the two parts of a mold can be firmly clamped together with high pressure during the molding operation.

Another object is to provide mechanism of improved construction for moving a turret on which the molds are mounted and the carrying means for the charge holders so as to move these parts into operative relation to each other for molding. A further object is to provide means of improved construction for locking the turret and the charge holder carrying member in correct relation to each other for each molding operation.

Other objects and advantages of this invention will appear from the following description and claims.

In the accompanying drawings:

Fig. 1 is an elevation of a molding machine embodying this invention.

Fig. 2 is a top plan view thereof.

Fig. 3 is a fragmentary sectional plan view thereof, on an enlarged scale.

Fig. 4 is a fragmentary elevation, partly in section, on line 4—4, Fig. 3.

Fig. 5 is a fragmentary elevation of a part thereof looking in the direction of the arrows on line 5—5, Fig. 3.

Fig. 6 is a fragmentary elevation thereof, showing the mechanism for exerting pressure on the mold to prevent separation of the parts thereof during the molding operation.

Figure 7 is a similar elevation, partly in section, and showing the parts in different positions.

Fig. 8 is a sectional elevation thereof, on line 8—8, Fig. 7.

Fig. 9 is a side elevation of a mold housing embodying our invention.

Fig. 10 is a fragmentary elevation of the mold housing shown in Fig. 9, partly in section, and showing the upper part of the mold housing in raised position.

Fig. 11 is a plan view thereof, partly in section, on line 11—11, Fig. 9.

Fig. 12 is a fragmentary elevation of the machine, partly in section on line 12—12, Fig. 3.

Fig. 13 is a fragmentary section of the machine, taken on line 13—13, Fig. 1.

Fig. 14 is a plan view, partly diagrammatic and showing the connections for supplying actuating fluid to the cylinders of the machine.

The frame or stand on which the parts of the machine are mounted may be of any suitable construction, that shown including a base plate 15 having two upright columns or pillars 16 secured thereto and an upright column 17 which may, for example, be of I or H-shaped cross section. The two pillars 16 and the pillar 17 have a pair of horizontal upper frame members 18 and 19 rigidly secured to the upper ends thereof. The flanges may be removed from the upper end of the column 17 so that the web portion 20 projects upwardly between the two upper horizontal frame members 18 and 19 which may be welded or otherwise secured to the web portion 20, and adjacent parts of the column 17. The upper ends of the pillars 16, which may be of rectangular cross section, may be slightly notched to receive the upper frame members 18 and 19, which are offset so that the portions secured to the columns 16 are spaced farther from each other than the ends thereof which are secured to the web of the column 17. The horizontal frame members 18 and 19 project beyond the columns 16 and terminate at a cross beam 21 extending crosswise of the machine and are rigidly secured thereto, for example, by welding.

The machine includes a turntable or turret 22 on which the molds are mounted, the turret being journalled to rotate about a pillar or column 23 which also extends upwardly from the base 15, and if desired, posts 24 may be provided for forming additional supports for the turret. These posts may have rollers 25 suitably journalled between a pair of plates 26 secured to the upper ends of the posts 24 and on which the lower face of the turret may bear. When a mold on a turret reaches the injection position, the two parts of the mold are clamped together to resist separation of the two parts of the mold during the injection, this clamping being effected by downward pressure exerted on the upper half of the mold. In order to resist this downward pressure exerted on the mold at the injection position, an anvil or support 27 is provided, the anvil being supported on a pair of plates or beams 28, one end of each of which is secured to one of the pillars 16 and the other end of which is secured to the column 23 on which the turntable is journalled. Since a heavy pressure is exerted against the mold which is in the injection position, which pressure reacts against the horizontal frame members 18 and 19, the frame of the machine is preferably further reinforced, and this, in the construction shown, is accomplished by providing a structural connection between the upper frame members 18 and 19 and the lower plates or beams 28 on which the anvil rests. This connection may, for example, include a lower transverse beam 30 arranged below the plates or beams 28, and on which these plates rest, the beam 30 being substantially of the same length as the upper cross beam 21 and the outer ends of the two beams 21 and 30 are connected by a pair of upright tension members 31. These tension members may be notched to receive the ends of the beams 21 and 30 and these beams may also be welded to the tension members, thus forming a rectangle or closed loop which serves to limit displacement of the upper frame members 18 and 19 relatively to the anvil supporting plates 28. The upper face of the anvil is preferably flat and forms a bearing surface on which the underface of the turret is supported so that the turret in its rotary motion slides on the upper face of the anvil to bring successive molds into injection position over the anvil.

The molds or dies are located in housings designated as 33 which are advanced with the turret on which they are supported so that they are positioned one at a time over the anvil 27, the upper surface of the anvil being formed to provide a bearing for the undersurface of the turret or turntable 22. During the injection of plastic material under heavy pressure, this pressure will tend to separate the upper and lower parts of the mold and suitable clamping means are, therefore, provided to prevent such separation of the parts of the mold. In the construction shown for this purpose, we have provided a platen 34, see particularly Figs. 1, 6 to 8, which may be pressed against the upper surface of the mold housing so that the platen presses the two parts of the mold housing together and also presses the mold housing and a portion of the turntable or turret 23 against the anvil 27. This platen may be movably mounted in any suitable manner, and in the construction illustrated, we provide brackets 35, which are welded or otherwise rigidly secured to the outer sides of the upright frame members 16. The outer ends of these brackets are apertured or otherwise suitably formed to receive vertical guide pins 36 having cylindrical portions which fit into holes formed on outwardly extending lugs or wings 37 of the platen, so as to permit movement of the platen from a mold disengaging position, shown in Fig. 6, to a mold clamping position shown in Fig. 7.

The movement of the platen relatively to the mold may be effected in any suitable or desired manner, and in the construction illustrated, we have shown a combination of a hydraulic cylinder and cams which multiply the power of the cylinder so that the platen will be urged against the mold with a very high pressure. In the construction illustrated, we have provided a cylinder 40 which is mounted on the upper face of the platen 34 and which is held in place on the platen by means of a plurality of bolts 41. The platen is provided with a passage 42 for motive fluid, connecting with the lower end of the cylinder 40, and the upper end of the cylinder is provided with a passage 43 for admitting fluid under pressure to the upper portion of the cylinder. The cylinder contains a piston of any usual construction to which a piston rod 45 is secured.

In order to multiply the pressure exerted on the piston by the fluid admitted into the passages 42 or 43, we have provided a cam mechanism which includes a movable cam member 47 which is guided for vertical movement by means of an upwardly extending projection or stem 48 which extends between two cross bars 49 and 50, the upper portions of which are rigidly secured to the lower faces of the horizontal frame members 18 and 19. The cross bar 49 is arranged directly below the transverse frame member 21, and if desired, this frame member may be recessed to receive an upwardly extending projection 51 of the cross bar 49. A similar upward projection of the cross bar 50 extends between the horizontal upper frame members 18 and 19 for more securely securing the cross bar in place. The inner surfaces of these cross bars guide the stem 48 of the movable cam 47 and preferably a pair of rollers 53 are arranged between the two cross bars and pivoted on bearing pins 54 extending through the cross bars, these rollers engaging the opposite sides of the stem 48 of the movable cam.

The movable cam is provided at opposite sides thereof with hook-shaped portions 56 which have curved recesses 57 formed therein, the recesses extending upwardly and toward each other. These cam recesses cooperate with rollers 58, each suitably journalled on a shaft 59. Both ends of each shaft have a pair of pressure links 60 connected therewith, see particularly Fig. 8. The lower ends of each pair of links are secured to a shaft 61. The two shafts 61 bear in arc-shaped recesses 62 formed in the upper surface of the platen 34.

Each of the upper two shafts 59 has a pair of rollers 64 suitably journalled thereon, and these rollers, which are arranged at opposite sides of the cam-actuated rollers 58, bear on stationary cams 65, which are suitably secured on the lower surfaces of the cross bars 49 and 50. These cams are of less thickness at the middle portion thereof than at the opposite ends thereof, and consequently, it will be obvious that if the upper ends of the pressure links 60 are swung outwardly, the rollers 64 will roll on the downwardly inclined portions of the cams 65 and thus cause the rollers and the pressure links 60 to move downwardly and to move the platen 34 downwardly. It will also be obvious that when compressed fluid is admitted into the lower end of the cylinder 40, thus forcing the piston rod 45 upwardly from the position shown in Fig. 7, the cams 57 will cause the upper ends of the pressure links 60 to swing from positions in which the rollers 64 engage the middle portions of the cams 65 as shown in Fig. 6, into positions in which the rollers engage the outer portions of the cams as shown in Fig. 7, thus in turn producing downward movement of the platen 34. By means of the cams described, the downward pressure exerted by the platen is many times that of the pressure exerted by the piston rod 45, and furthermore, the platen will be rigidly held in its lower position in such a manner that upward pressure of the upper portion of a mold housing 33, as would occur during the injection of plastic material into the mold, would not exert any substantial downward pressure on the piston rod 45, for the reason that the pressure links 60 extend nearly at a right angle to the inclined surfaces of the cams when the parts are in the position shown in Fig. 7.

Suitable means are also provided for supporting the platen 34 in an upper position clear of the molds 33 when the clamping pressure on the molds is not required, so that the molds may be passed by the turret into a position between the anvil and the platen. In the construction shown for this purpose, means are provided for limiting the extent to which the movable cam may be lowered, so that fluid pressure acting on the upper face of the piston in the cylinder 40 will tend to raise the platen. Any suitable means may be employed for this purpose, and in the construction shown, the two arms of the movable cam 60 are provided near their outer portions with shoulders 67, and suitable stationary stops are provided with which the shoulder portions may engage for limiting downward movement of the movable cam. In the construction shown for this purpose, a pair of angle bars 68 are provided at each end of the movable cam, the angle bars being secured at their upper ends to the cross bars 49 and 50 and having cross pieces 69 secured to the lower ends thereof in position to be engaged by the stop shoulders 67 on the movable cam. Consequently, when fluid under pressure is admitted to the upper inlet 43 of the cylinder and presses downwardly on the upper face of the piston, the movable cam 47 is moved downwardly to move the upper ends of the pressure links 60 toward each other, and thereupon the shoulders 67 will engage the stop members 69 so that the movable cam will be supported or hung from the stop members, as shown in Fig. 6. Farther downward movement of the piston of the cylinder 40 will, consequently, be prevented and the fluid pressure will act on the upper cylinder head to raise the cylinder 40, and thus cause the platen 34 to be raised clear of the mold 33.

It will be noted that when the pressure is applied to the mold, the reaction between the various forces is mainly absorbed by the rectangular pressure resisting frame or closed loop which has been described, and which includes the two upright tension members 31 and the transverse plates or beams 30 and very little of these forces are transmitted to other parts of the frame of the molding machine. The clamping of the mold by means of the construction described serves not only the purpose of preventing the seperation of the two parts of the mold, but also holds the mold firmly against movement when the injection nozzle is pressed against the mold about the opening therein, thus preventing the transmission of any horizontal pressures as a result of the injection, to the turntable and to the upright column 23 on which the turntable is supported.

The mechanism thus far described may be used in connection with any desired molding material, and the injection of material into the molds may be accomplished by any suitable or desired means. We have, however, herein illustrated suitable means by which the machine is enabled to operate in connection with the molding of rubber or rubber-like materials. The term "rubber" is herein employed to include not only natural rubber, but also any rubber-like materials which are thermo-setting or which can be vulcanized by heat. Satisfactory molding of rubber articles involves the difficulty that if the rubber prior to molding is cut in small pieces which are fed to the apparatus, these pieces when exposed to air, dust, and the like, rapidly have films formed on their surfaces which prevent the producing of molded articles in which all parts of the articles are homogeneously bonded together. In other words, if a portion of rubber having a film thereon enters the mold, the adjacent particles or rubber do not adhere properly to the film, thus forming weak places in the molded articles.

In order to accomplish this desired result, we provide on a machine an apparatus for thoroughly mixing and plasticizing the material, and then transferring or extruding measured charges or quantities of the material to a charge holder, by means of which the charge of material is carried to the injection position for injection into the mold. Any suitable or desired apparatus may be employed for thoroughly mixing and extruding the stock, and in the construction illustrated, we have shown an extruding apparatus having a housing 72 having a cylindrical bore in which a worm 73 operates, see particularly Fig. 2, the housing having a receiving opening 74 into which milled stock of rubber may be fed or into which a milled stock may be automatically drawn by rotation of the worm 73. The worm is turned in any suitable manner by means of a motor 75 connected by means of a transmission chain covered by a guard 76, or other suitable transmission means to the worm shaft. This apparatus is well known in the art, and is similar to apparatus used for extruding rubber, for example, for forming rubber tubing and is, therefore, not herein described in detail. The worm forces the rubber through a discharge orifice 77, Fig. 12, into a nipple or nozzle 78 of a holder, when the holder is moved to the left in Fig. 12, so that the nipple enters the outer part of the discharge orifice 77 of the extruding apparatus.

Material to be injected into a mold is carried from the extruding apparatus to a mold by means of a charge holder. In the construction shown for this purpose, a plurality of holders for carrying charges of the material to be molded from the extruding apparatus 72 into position to be injected into a mold are mounted on a movable member so that they can be moved back and forth between the extruding apparatus and the molds, and in the particular construction shown, four of these charge holders are provided and are mounted on four arms of a spider 80 which is rotatably mounted on the machine in any suitable manner. For example, the machine may include an angularly arranged frame comprising a pair of upright frame members 81 which may, for example, be in the form of I beams, the lower ends of which are rigidly secured to the base 15, see Figs. 1, 2 and 3. The upper ends of these upright frame members are connected by means of a horizontal member 82 which as shown is also in the form of an I beam which may also be secured to the lower surfaces of the upper horizontal frame members 18 and 19 for further reinforcing the same and for holding the auxiliary frame member in fixed relation to other parts of the machine. One of the upright columns 81 has a bearing member 83 rigidly secured thereto in any suitable manner. For example, the bearing member 83 may have a base 84 which is welded or otherwise secured to one of the upright columns 81. The spider 80 has its hub portion journalled on the bearing member 83, and is held against movement lengthwise of the bearing pin in one direction by a shoulder formed on the bearing member, and in the other direction, by means of a disk or washer 85 secured to the outer end of the bearing pin by means of a screw 86, see particularly Fig. 3. Any other means for rotatably mounting the spider 80 may be employed.

The charge holders for the plastic material may be secured to the ends of the arms of the spider in any suitable or desired manner, and in the construction illustrated, the ends of the arms are provided with webs or pads 88 which extend at an angle to the axis of the spider and the outer surfaces of which are preferably flat and are formed to receive flat bases 89 of cylindrical guide members or sleeves 90 for the charge holders 91. The guide members 90 have portions of their cylindrical peripheries cut away, as clearly shown in Figs. 1 and 3, to render portions of the charge holders accessible, and the charge holders are movable axially to a limited extent relatively to their guide sleeves.

Each holder comprises a cylindrical shell portion 92 of such diameter as to fit in the cylindrical holder guide 90 and to slide therein and an end portion 93 of rectangular form, the rectangular part being smaller in diameter in one direction than the diameter of the cylindrical part thereof, while in a direction at a right angle thereto, the rectangular part is approximately equal to the diameter of the cylindrical part, so that the corners of the rectangular part act as stops to limit the extent to which the charge holder may move in its guide toward the axis of the spider, as may be clearly seen in Fig. 5. The rectangular part of each charge holder terminates in the discharge nozzle 78 of the holder.

Each charge holder is provided with a central cylindrical aperture of substantially uniform diameter throughout the greater portion of its length, but which terminates in an aperture of materially smaller diameter in the nozzle 78, and a plunger 94 is slidably arranged in the central aperture of the charge holder for forcing the charge of material out of the holder into the mold. The plunger 94 preferably has a disk-shaped portion 95 in the outer end thereof which fits within the cylindrical bore of the holder guide and acts as a crosshead to keep the plunger 94 in alignment with the bore in the holder. The disk 95 also has a portion 96 of reduced diameter which may be engaged by a movable part to force the plunger 94 lengthwise of the aperture in the holder. Preferably a stop 97 is provided on the end of the holder guide by means of an inturned portion or flange thereof, see Fig. 3, for the purpose of limiting the return movement of the plunger 94 in the guide when the holder is being filled with a charge of material to be molded. Thus it will be noted that the rectangular part of the charge holder limits its movement relatively to the guide, and the stop flange 97 limits the movement of the plunger out of the charge holder, the two stops cooperating to determine the capacity of the charge holder. Any other means for limiting the movement of these parts may be provided, if desired.

Means are also provided for urging the charge holders yieldingly into their innermost positions toward the axis of the spider on which they are mounted, so that by rotation of the spider, the holders can easily be moved one at a time into axial alignment with the inlet orifice of a mold and can then be moved lengthwise of their holder guides to fit the discharge nozzles 78 of the charge holders into the charge receiving apertures of the molds.

Any suitable means may be employed for this purpose, and in the construction illustrated, we have provided at a side of each holder guide 90 a projecting part or shelf 99 which forms an additional guide for the charge holder in its movement in the holder guide 90 in that one face of the rectangular portion 93 of the holder may slide on this shelf. The shelf, consequently, also prevents rotation of the charge holder in its guide. The shelf further serves as a support for a spring, and in the construction shown for this purpose, the shelf is provided with an outwardly extending web or lug 100 having an aperture therein through which a pin 101 extends. The opposite ends of the pin serve to support two coils 102 of U-shaped spring, see particularly Figs. 3, 5 and 12, the spring having a U-shaped portion 103. The ends of the springs beyond the coils are supported by means of a pin 104 secured in a hole in the web or lug 100 and extending outwardly from opposite sides thereof. This pin places the coils of the springs under tension in a manner to urge the U-shaped portion 103 of the spring against the charge holder.

In the particular construction shown, each charge holder is also provided with a pair of wheels 105 rotatably mounted on bearing pins 106 secured to opposite sides of the rectangular part of the holder, and the sides of the U-shaped portions of the springs in the particular construction shown engage these pins 106, and thus urge the charge holder into its guide, until the corners of the rectangular portion thereof engage the end of the holder guide. It will be noted that the springs alone hold the charge holders against outward movement in their guides and by flexing a spring out of engagement with its charge holder, the charge holder can be readily removed radially of the spider and can be quickly replaced by another charge holder. Consequently, charge holders can be readily cleaned or repaired without shutting down the machine.

Means are provided for drawing each charge holder as it arrives at the charge receiving station into engagement with the discharge portion of the extruding apparatus 72, for injecting material into the charge holder. In the construction shown for this purpose, Figs. 2, 3 and 12, there is mounted on the extruder a pair of levers 110 which have the lower portion 111 thereof offset and extending toward each other and formed to engage the wheels or rollers 105 of each charge holder as it moves between the levers into charge-receiving position at the extruder 72. These levers may be pivotally mounted in any suitable manner, for example, on brackets 112 suitably secured to the extruder, for example, by means of posts 114 secured to the extruder and to the ends of which the brackets are fastened by means of screws. The levers are pivoted to the brackets 112 on suitable bolts or pins 113. The other ends of the levers may be connected with any suitable power device for swinging the levers so that the lower end portions 111 thereof, by engaging the rollers 105, will move the charge holders 91 into engagement with the extruder 72 so that the nozzles 78 thereof may be tightly pressed into operative relation to the discharge orifice 77 of the extruder. In the construction shown for this purpose, we have provided a cylinder 115 which may also be mounted on the extruder and which has a piston 116 therein connected by means of a piston rod 117 to the upper ends of the two levers, for example, by means of a yoke 118, Fig. 2.

From the foregoing description, it will be obvious that when fluid pressure, such for example as compressed air, is admitted into the cylinder 115 through the pipe 120, the piston 116 will be moved against a return spring 121 in a direction to the right in Fig. 12, thus swinging the levers 110 in a clockwise direction and drawing the inwardly extending end portions 111 of the levers to the left against the rollers 105, which results in moving the charge holder 91 to the left so that the nozzle 78 thereof enters into the discharge aperture 77 of the extruder.

The swinging of the levers 110 also causes the motor 75 of the extruder to be operated momentarily to discharge material from the extruder into the charge holder. This may, for example, be accomplished by means of a switch or motor starter 124, which, in the construction shown, is mounted on top of the cylinder 105. This switch or starter has a push button or plunger 125, Fig. 12, which is normally urged outwardly into circuit closing or motor starting position, and is held against outward movement by an upwardly projecting arm 126 secured to the yoke 118. When the parts are in the position shown in Fig. 12, the operation of the motor is interrupted because the plunger 125 is pressed inwardly by the arm 126. However, when the piston 116 moves the yoke 118 to the right in Fig. 12, the plunger 125 moves outwardly into motor starting position.

The quantity of material which is fed to the charge holders may be controlled by means of a limit switch 127 having a lever 127a, Fig. 3, the end of which is arranged in the path of movement of a part of the plunger 94, for example, the disk 95. This switch may be in the circuit of the extruder motor 75 and is normally closed by suitable spring means but is moved into open position by the actuation of the lever 127a by the plunger. This switch may be otherwise connected to stop the motor when the switch lever 127a is actuated by the plunger. The switch 127 may be adjustably mounted on a suitable bracket 127b, which may, for example, be secured to the frame member 17. By proper location of the switch member on the bracket, the quantity of material extruded into each charge holder may be controlled as may be required by the cavities in the molds.

The spider on which the charge holders for the material are mounted is advanced so that the charge holder which has just been filled is moved away from the extruder and an empty holder moves into position to receive a charge of material from the extruder. At the same time, one of the charge holders which has been filled is moved opposite the charge receiving opening in a mold on the turntable 22, thus occupying the position shown in Fig. 3. When this movement of the spider is completed, the piston 94 of the charge holder is pressed into the bore of the holder for discharging the charge from the holder through the discharge nozzle 78 thereof into the mold, and in the particular construction illustrated, this is accomplished by means of another cylinder 128 having a piston therein provided with a piston rod 129. Fluid pressure in the cylinder will force the piston to move to the left in Fig. 3 so that the end of the piston rod 129 will engage the part 96 of the piston 94 of the holder. During the initial movement of the charge holder piston, the charge holder itself will move toward the mold against the action of the spring 103 because of the friction between the material and the walls of the holder, this friction being sufficient to cause the piston 94 to move the charge holder into a position in which the discharge nozzle 78 thereof registers with the receiving opening in the mold, whereupon farther movement of the piston 94 forces the charge from the charge holder into the mold to an extent necessary to fill the entire mold cavity completely. During this operation, the charge holder will be pressed against the mold with sufficient force, due to the friction between the charge and the wall of the charge holder, to ensure the charge entering the mold cavity. Upon completing of the molding operation, the piston in the cylinder 128 is moved in the reverse direction, but the piston 94 will remain in the charge holder 91, and the holder together with the piston 94 will be moved back into the charge holder guide by the spring 103. The charge holder will then again be in the position shown in Fig. 3, but the piston 94 will be in the same relative position in the charge holder which it occupied at the termination of the molding operation. The spider 80 and the turret 22 are then advanced to place another mold into position to receive a charge from another charge holder.

The construction described has the advantage that the machine may be operated with an extruder which does not extrude the material with sufficient pressure to inject the material into a mold cavity. The extruder also effects a thorough mixing of the material to be molded so that any skin or crust on the milled stock fed to the extruder will be broken up and disintegrated so that all of the material when finally injected into the mold will be homogeneous and will bond or knit together so that no weak places will be found in the molded articles. Also the charges of material fed to the charge holders will be protected from contact with air, dust, or the like, so that no films or coatings will be formed on the charges. The extruder also heats the material because of the working of the same by the spiral or feed screw 73 of the extruder, thus rendering the material more plastic and ready for molding, thus facilitating the forcing of the same into the charge holder and the injection of the same into the mold cavity.

When the machine is used in connection with the molding of rubber or rubber-like materials, it may at times be necessary or desirable after each molding operation of the machine to remove from the charge holder any material remaining therein, and for this purpose, each charge holder moves from the molding position to another position in which the remaining material may be removed from the charge holder, this being the lower position of the holder, as shown in Fig. 1. When in this position, the disk or crosshead 95 of the charge holder piston 94 is located in operative relation to the end of a lever 132, one end of which may be pivoted on the upright frame member 81. Another cylinder 133 is mounted on the upright frame member 81, preferably by means of a pivotal connection 134, and the piston rod of this cylinder is pivotally connected by means of a clevis 135 to the lever 132. When motive fluid is admitted to the cylinder 133 to the upper side of the piston therein, the piston will move the clevis downwardly and also swing the lever 132 downwardly so that the outer end thereof presses against the disk or crosshead 95 of the charge holder piston 94 and forces this piston to the lower end of the bore in the holder, and at the same time, moves the charge holder downwardly against the action of the holder return spring 103.

Below the charge holder while in this position, is arranged a device for removing material from the opening in the discharge nozzle of the charge holder when the holder piston 94 has moved to the limit of its stroke in the charge holder, this device including a stripper ring support 136, Figs. 1 and 13, which is provided with an aperture formed to receive the discharge nozzle 78 of the holder, this stripper ring being mounted on a suitable auxiliary frame including a member 137 which is inclined so as to be substantially perpendicular to the axis of the charge holder when in stripping position, and which is secured in any, suitable manner, for example, at one end thereof, to one of the upright frame members 81 and at its other end to a post 138 extending upwardly from and secured to the base 15 of the machine. This frame member 137 is provided under the stripper ring support 136 with an aperture 139 through which the excess material may drop, for example, into a receptacle 140 underneath the discharge aperture. The stripper ring support 136 is provided on its underface with a circular opening or recess in which is secured a stripper ring 141 having a series of openings or apertures therein through which the left-over material 142 may be forced as clearly shown in Fig. 13, and in its upper face, the stripper ring support has a tapered hole into which the discharge nozzles of the charge holders may enter when the charge holder is moved toward the stripper. The middle or hub portion of the stripper ring has a suitable projection mounted thereon which extends into the discharge aperture in the nozzle 78 of the charge holder to remove excess material therefrom, and this projection may be of any suitable kind, and in the construction shown, is of spiral configuration somewhat similar to an auger as shown at 144, the stem 145 of which is mounted in the hub portion of the stripper ring so that the spiral or auger portion will extend into the discharge aperture of the charge holder when the same is moved in its guide toward the stripper. This projection or auger member is held stationary and as the piston 94 of the holder moves to the end of the cylindrical bore in the charge holder, it forces material in the charge holder into and through the discharge orifice. The material in the discharge orifice will flow around the spiral or auger bit, and consequently, when the charge holder is moved upwardly out of the position shown in Fig. 13, upon reversal of the pressure in the cylinder 133, which causes the lever 132 to move upwardly in Fig. 1, the return spring 103 will move the charge holder away from the stripper ring and cause the material remaining in the discharge orifice of the charge holder to adhere to the auger bit as the holder is moved away from the stripper ring, thus clearing the material out of the discharge orifice of the holder. Any other means may be provided for removing the remainder of the charge of material from the holder, or if the machine is operated on a material which does does require removal of the remaining material, this mechanism for removing the remaining material may, of course, be omitted.

Means of any suitable construction may be provided for advancing the turntable 22 and the spider 80 so as to bring the successive molds into correct position relatively to the holders on the spider and for bringing these holders on the spider into positions to receive a charge, to deliver the charge to the mold and to permit the remainder of material to be removed therefrom. In the construction shown for this purpose, see particularly Figs. 1 to 4, the advancing mechanism is actuated by means of a piston arranged in a cylinder 150, the piston having a piston rod 151 which is connected to an outwardly extending part or arm 152 rigidly secured on a slide 153. This slide in the particular construction shown is mounted to slide on a side of the anvil 27, for example, in a groove or slot formed in the side of the anvil in which the slide 153 may reciprocate, and in which it may be confined by flanges or parts 154 of the anvil which overhang the slot therein in which the slide 153 reciprocates, see Fig. 4. One end of the slide has a link 155 pivotally connected therewith, the other end of the link being connected to a pawl arm 156, one end of which is secured to a sleeve 157 which is mounted to oscillate about the bearing pillar 23 on which the turret or turntable 22 is rotatably mounted. 159 represents a ratchet ring which is suitably secured to the lower face of the turret 22, and which has ratchet teeth 160, with which a pawl 161 pivoted on the end portion of the pawl arm 156 may engage. One end of the pawl has a spring 162 secured thereto for urging the other end of the pawl into engagement with the ratchet wheel 159. The movement of the slide 53 in the construction shown is such that at each reciprocation thereof, the turret is advanced to a distance equal to the distance between adjacent ratchet teeth 160.

The other end of the slide 153 is suitably connected to produce intermittent rotary motion of the spider for advancing the same step by step. In the particular construction shown for this purpose, the slide 153 has an upwardly extending arm 165 and which is rigidly secured to the slide. At one side of this upwardly extending arm, a connecting rod 166 is pivotally mounted, and the other end of the connecting rod is pivotally secured to a pawl lever 167 which is rotatably mounted on a portion of the bearing stud 83 on which the spider is rotatably mounted. The other end of this pawl lever has a pawl 168 pivotally mounted thereon, the pawl in this construction being formed to engage with the teeth of a ratchet wheel 170 which is secured to the hub portion of the spider 80, the dogs dropping by gravity into engagement with the teeth 171 of the ratchet wheel 170. Consequently, by reciprocation of the slide 153, the pawl lever 167 will be moved from the position shown in broken lines in Fig. 4 to the full line position, thus advancing the spider through a quarter of a revolution, the spider in the particular construction shown having four arms carrying the four charge holders for the material. Consequently, movement in one direction of the slide 153 will simultaneously advance the turret 22 and also the spider 80 so that a mold to be charged and a charged holder containing a charge are simultaneously brought into operative relation to each other.

Means are also provided for locking the turret and the spider when in operative relation to each other, and the locking means are preferably also formed to position the spider and turret relatively to each other more accurately than can be done by means of the ratchet mechanisms only. For this purpose, the turret is provided with a latch member 175 for each position of the turret and the anvil 27 is provided with a suitable recess in which a locking dog 176 is slidably arranged, see particularly Fig. 3. The outer end of the dog is accurately formed to fit into an accurately formed notch or recess 177 in each of the latches 175 of the turret. The locking dog is mounted on a stem about which a coil spring 178 is arranged, one end of the coil spring bearing against the end of the locking dog 176 and the other end bearing against the base of a guide bracket 179, which base is rigidly secured to a side of the anvil 27, and has a leg or web extending from the base toward the middle portion of the turret. The pin, to one end of which the locking dog 176 is secured, has a head 180 formed on the other end thereof. This head is arranged to extend along the leg of the guide bracket 179 and preferably has a roller 182 pivotally mounted on one side thereof near the outer end of the arm of the bracket, in such a manner that the roller extends downwardly below the lower edge of the leg of the guide bracket. The spring 178 urges the dog 176 into engagement in the recess 177 of any of the latches 175, and consequently, serves to lock the turret in fixed position and also accurately position the turret so that a mold mounted thereon will be accurately located with reference to a charge holder 91.

Means are also provided for moving this locking dog 176 out of its locking position, to permit advancing the turret. For this purpose, the slide 153 is provided with a shoulder 183 formed on the upper surface thereof. The roller 182 and the shoulder 183 are so located relatively to each other that during the movement of the slide 153 to the left in Fig. 3, the shoulder 183 contacts the roller 182, resulting in movement to the left in Fig. 3 of the roller 182 and the locking dog 176 connected therewith, thus withdrawing the locking dog from the latch 175 during the latter part of the movement of the slide. After the slide has moved to the limit of its movement to the left in Fig. 3, thus causing the latch 181 to engage another tooth 169 of the turret ratchet wheel 159, the slide 153 moves back in the opposite direction, thus imparting movement to the turret while the dog 176 is held out of engagement with a latch. After initial movement of the turret by the slide, at least sufficient to move the latch 175 out of the path of the locking dog, the shoulder 183 of the slide moves out of engagement with the roller 182, thus permitting the dog to be again moved outwardly by the spring 178 and when the next latch 175 approaches the dog 176, the curved or cam face thereof moves the dog back until the notch or recess 177 in the latch registers with the dog, whereupon the spring 178 will move the dog into locking position in this latch.

The spider 80 is also provided on each arm thereof with a latch 185, these latches being similar in form to the latches 175 on the turret, and each latch is formed to cooperate with a locking dog 186 which is slidably mounted in a guide or slideway 184 secured on a fixed part of the machine, for example, on one of the upright columns 16, see Figs. 3 and 4. This locking dog is also pressed by means of a coil spring 187 into holding position and the dog is provided with an outwardly extending arm or projection 188 which extends into the path of movement of the upwardly extending arm 165 of the slide. Consequently, during the return movement of the slide 153 to place the pawl 168 into engagement with another tooth of the ratchet wheel 170, the upper portion of the upright arm 165 will move into engagement with the arm or projection 188 of the locking dog 186. This arm preferably has a face extending transversely of the direction of movement of the slide, so that the upright arm 165 of the slide when in the position shown in broken lines in Fig. 3, will engage the arm 188 of the locking dog and move the same to the left in Fig. 3, or to the right in Fig. 4, thus disengaging the locking dog from its latch 185. During the opposite stroke of the slide, after the spider has been advanced to some extent, the upright arm 165 of the slide again releases the locking dog 186 so that the same may move into engagement with another latch member on the spider. Any other means for locking the turret and spider in their operative positions may be provided, if desired.

The mold housings 33 are shown in Figs. 1 and 2 and more in detail in Figs. 9 to 11 inclusive. Each of these mold housings includes a base plate 190, see particularly Fig. 2, which rests directly on the turret of the machine. Each of these base plates has an upwardly extending flange or wall 191 which is preferably formed integral with the base plate. Each mold housing is made in two parts, the lower part 192 which is secured to the base plate in any suitable manner, and an upper part or top 193 which is hinged to the lower part. The lower part may be provided with lugs at the inner end thereof, namely, the end nearest to the center of rotation of the turret, and the upper part of the mold housing is provided with brackets 195 which have slots therein through which hinge pins 196 may extend. The lower half of the mold housing has a web or horizontal wall having a substantially flat upper surface 197 on which the lower die or mold 198 may rest, and the upper half of the mold housing has a corresponding web or wall with a lower surface 199 against which the upper mold or die 200 may bear. The molds or dies may be heated in any suitable, or desired manner, and in the construction shown, the mold housings are provided with annular recesses which terminate at the die supporting webs or walls and in which electric heating elements 202 of annular form may be arranged to be as close as possible to the flat walls or webs of the mold housing halves which support the molds or dies 198 and 200. Preferably one of the halves of the mold housing is also provided with a hole therein extending from one end thereof adjacent to the surface which supports the mold or die and a thermoresponsive element 203 is arranged in such hole in a position to be responsive to temperatures of the dies or molds. If a heat-responsive element is used containing an expansible fluid, such element may be connected by means of a suitable tube 204 with a current-controlling device 205 mounted on the upstanding part 191 of the base plate 190 of the mold housing, see Fig. 2. This device may be provided with an adjustable knob 206 by means of which the temperature to which the mold housing is heated may be controlled or which may serve to interrupt the flow of current to the mold housing. A pilot light 207 may also be provided on the upstanding part 191 of the base plate for each mold housing, which indicates when current is flowing to the heating elements in the mold housing.

In the construction illustrated, heating elements 202 are provided in both the upper and lower parts of the mold housings, current being supplied to the heating elements by means of conductors 208 and 209 which connect with the current-controlling devices 205. The annular hollow portion of the lower mold housing below the heating element therein which terminates at the base plate 190, may be filled with asbestos or other suitable heat insulating material, and similarly the upper mold housing is provided with a similar annular upwardly opening recess, in the lower part of which the heating element of the upper mold housing part is arranged, and the upper portion of this annular recess may be filled with heat insulating material. In the case of the upper mold, a cover or closing plate 210 is provided to close the open space in the upper mold housing. Any other means for supplying heat to the two parts of the mold housing and for regulating the temperatures of the same may be provided.

The dies 198 and 200 may be removably secured in the adjacent portions of the two parts of the mold housing in any suitable or desired manner, so that the cavities of the two dies or molds will be in accurate registration with each other. In the construction shown for this purpose, the lower mold housing is provided at opposite sides thereof with upwardly extending guide walls 212 between which the mold 198 will fit acurately, and the inner end of the lower part of the mold housing is provided with an upwardly extending wall or projection having an undercut edge portion 214 into which the beveled end of the lower mold or die 198 may extend. The mold or die may be held in correct relation to the lower mold plate by means of a pair of set screws 215 extending diagonally with reference to an enlarged portion of the mold housing wall 212, and the mold or die may be provided at the outer corner portions thereof with grooves or slots 216 forming edges against which the set screws 215 may engage. Any other means for securing the lower mold or die to the lower mold housing may be provided. In the case of the upper mold housing part, a similar construction is provided, a flange or wall portion being provided with an undercut edge 218 against which the beveled inner edge of the die or mold may be pressed, and the upper mold housing may be provided at both sides with downwardly extending wall portions or flanges 219 between which a die will fit accurately, and with set screws 220 for securing the upper mold or die to its mold housing part.

In addition, the two molds or dies may be provided with posts or pilot pins in one of the molds or dies entering holes in the other mold or die so as to ensure correct registration of the molds or dies with each other, these pilot pins and holes not being shown, since they are commonly used in connection with molds or dies of this type.

Means are also provided for clamping the two parts of each mold housing together and securing them in clamped position, and for readily releasing the mold housing parts from clamped position and swinging the upper mold housing part away from the lower one so that the dies or molds will be easily accessible for removing molded parts therefrom. In the construction shown for this purpose, we have provided a link mechanism which is hand-operated and which includes a pair of toggle links 224 and 225 connected by means of a pivot 226. The toggle link 224 is pivoted to a lug or projection 227 on the upper part of the mold housing, and the lower end of the other toggle link 225 is pivotally mounted at 228 on the lower mold housing part. One set of these toggle links is preferably provided at each side of the mold housing.

It will be readily seen that when the toggle links are in the position shown in Fig. 9, the mold housing parts are securely drawn together and the three pivots of the toggle links are substantially in alignment or in dead center relation to each other so that the mold parts will be locked in their closed positions. The upper links 226 are provided with handles 230 by means of which the toggle links can be readily moved into opening and closing positions. When the toggle links are swung by means of the handles 230 into the positions shown in Fig. 10, the upper mold housing half will be swung about its pivotal connection into open position in which both of the molds or dies are readily accessible, and the pivotal connections between the links will again be at or past dead center positions so that the upper mold housing part will be securely held in its open position.

It is desirable to provide the toggle mechanisms at each side of each mold housing with a certain amount of resilience so that slight variations in the thickness of the dies will not require adjustment of the toggle links and so that the two parts of the mold housing will be yieldingly pressed together. In the construction shown for this purpose, the lower pivot of the toggle link 225, instead of being mounted directly on the lower mold housing part is pivotally connected to one end of a link 231, the other end of which is pivotally connected at 232 to the lower mold housing part. The link 231 is provided with a central aperture through which a bolt or screw 233 may pass, the lower end of this bolt having a threaded connection with a lug 234 extending outwardly from the lower mold housing part. 235 represents a coil spring which is arranged between the head of the screw 233 and the link 231 so as to press this link downwardly. By turning the screw 233, the spring 235 may be placed under initial compression to the desired extent, to adjust the pressure with which the upper mold housing part is pressed against the lower. Other means for securing the two parts of the mold or die together may be employed.

Current may be supplied for heating the mold or die in each of the housings in any suitable or desired manner, and in the construction illustrated in Figs. 1 and 2, we have provided collector rings 238 mounted on the portion of the stationary pillar 23 which extends above the turret 22, these rings being stationarily mounted on the pillar 23 and suitably insulated therefrom and from each other and may be connected to a suitable source of electric current through terminals 239 extending upwardly beyond an insulating bushing or cylinder 240 on which the collector rings 238 are mounted, see Fig. 2. A post 241 extends upwardly from the turret 22 to which it is secured and has a plurality of brush holders 242 mounted thereon, one brush being provided for each collector ring. Conductors 243 may connect these brushes to the current-controlling devices 205 mounted on the upwardly extending parts of the base plates of the mold housings, only one set of these conductors being shown in Fig. 2, the others being omitted for sake of clarity. Any other means for conducting electric current or other heating medium to the mold housings may be provided.

Means are preferably provided for removably mounting the mold housings on the turret in such a manner that they can be readily removed and replaced in accurate relation to the turret. In the construction shown for this purpose, the latches 175 of the turret are each provided with two upwardly extending arms or fingers 250 which may be formed integral with the latches and which extend above the upper surface of the turret and preferably have projections 251 at the upper ends thereof which extend over the edge of the turret. These projections 251 of the fingers are accurately formed to extend into suitable recesses 252 formed in the lower parts of the mold housings, so that when the mold housings are moved toward the edge of the turret with the projections 251 entering the recesses 252, the lower mold housings will be accurately located with reference to the latches 175. The projections 251 of the fingers, in the construction shown, are formed to extend over the outer edges of the base plates 190 of the mold housings. In the construction shown, only the outer edges of the projections 251 engage accurately formed side portions of the recesses 252 in the lower mold housing parts, thus avoiding the necessity of having all of the walls of the recesses 252 accurately formed. The inner edges of the arms or fingers engage the outer edge portions of the base plates 190 of the molds, thereby locating the molds in definite relation to the outer edge of the turret 22.

The parts described will hold the lower mold housing parts in correct relation to the turret against displacement in any direction except toward the axis of the turret, and consequently, we provide the turret with upwardly projecting bosses or studs 255 which are formed to engage corners of the base plates 190 and portions of the inner ends of the lower mold housing parts. These bosses or studs 255 may be the heads of pins 256 secured in holes in the turret 22. Each base plate 190 of the mold housing is of less width at the part thereof beyond the inner edge of the mold housing than at the mold housing itself, and consequently, this reduction in width forms square corners on the base plates into which the studs 255 may fit for holding the mold housings in accurate relation to the turret. By means of this construction, any mold housing can be very quickly and easily removed from the turret by simply lifting the inner end of the mold housing or its base plate 190 so that it is clear of the studs 255, and then sliding the base plate and mold housing inwardly toward the axis of the turret to disengage the fingers 250 and their projections 251, whereupon the mold housing can be removed from the turret. Similarly a mold housing may be quickly positioned on the turret. The electrical connections between the brushes 242 and the electrical devices mounted on the upwardly extending parts of the mold housing bases are preferably made readily detachable so that the cords or conductors 243 may be easily detached from the molding housing before it is removed from the turret.

In the operation of the molding machine, the mold housings are, of course, closed by means of the toggle mechanisms or other suitable closing devices before they reach the injection position. When at the injection position above the anvil 27, the two parts of the mold housings and the molds or dies contained therein are pressed together by means of the mechanism which has been described, for the reason that the injection pressure is much greater than the pressure that can be exerted by the toggle links to hold the mold parts together. After the injection has been completed, this pressure is released and the toggle mechanisms described are then sufficient to hold the mold housings together for the purpose of curing or vulcanizing the molded articles by the heat of the molds. After the mold housings have been advanced through a number of stations beyond the injection station, the housings may be opened by hand and the molded parts removed therefrom, and the molds may be cleared of all remnants of material that may be left in them, so as to be ready for the next mold operation, whereupon the upper mold housing part is again lowered by means of the toggle mechanism and clamped tightly against the lower mold housing part.

The cycle of operations of this machine may be controlled automatically in any suitable or desired manner, for example, by means of a series of compressed air valves which actuate valves controlling the flow of hydraulic pressure from a pressure pump 260 which may be driven by an electric motor 261, the motor and pump being preferably also mounted on a liquid reservoir 265, which is in turn mounted on the base plate 15 of the machine, see Fig. 2. For sake of clarity, we have not shown the various valves on the first thirteen figures of the drawings, but have shown them more or less diagrammatically in Fig. 14, in which liquid under pressure may be supplied from the pump through a pipe or tube 263, and in which 264 represents a return pipe returning the liquid to the reservoir 265.

The operation of the machine may be controlled by means of compressed air received from any suitable source of supply through a pipe 267 leading to a pressure reducing valve 268, if such type of valve is required, and from this pressure reducing valve, the air enters a valve 266 having a handle by means of which the valve may be set into open position either manually or by suitable intermittently operating means (not shown). When valve 266 is open, air is supplied through a pipe 270 to a pipe 271 through a normally open valve 272 and to relays 273 and 274 and to a diaphragm actuated hydraulic valve 275. This valve is opened by the air pressure to supply liquid under pressure to the cylinder 150, this liquid passing through a pipe 276 to the end of the cylinder to move the piston therein toward the cylinder head, and thus advance the turret and the spider to move a mold and a charge holder into operative relation to each other at the injection molding station. When the piston of this cylinder 150 completes its intake stroke for advancing the turret and the spider, it will open the relay valve 274, thus allowing air to enter the top of the diaphragm valve 278 to which liquid under pressure from the pump enters through the pipe 263. The hydraulic air controlled valve 278 admits liquid under pressure through the tube 280 to the inlet connection 42 at the bottom of the cylinder 40, thus forcing the piston therein upwardly and the platen 34 downwardly to clamp the two mold housing parts securely together. When this piston reaches the upper end of its travel, it opens the air valve 273 and admits air through a pipe 277 to the diaphragm top of an air operated hydraulic valve 281, which admits liquid under pressure to the head of cylinder 128 through pipe 283, thus causing the piston in this cylinder to force the charge out of a charge holder into the cavity of a mold. At the same time, this valve 281 also admits liquid under pressure to the head of the piston 133 to actuate the lever 132 to remove any remaining charge of material from a charge holder which has just left the injection station. The forward motion of the piston or plunger of the cylinder 128 closes the air valve 272, which is normally open. When the hydraulic pressure in the cylinder 128 reaches a predetermined point, such, for example, as a pressure of 500 pounds per square inch, due to the fact that no more charge from a charge holder can be injected into a mold, this pressure is transmitted through pipe 284 to the valve 266, causing it to be unlatched and moved into position to stop a further supply of air to the pipe 270 and to discharge the compressed air from this pipe up to the valve 272, which is still closed.

The discharge of air from the pipe 270 also releases the air pressure from the diaphragm top of the valve 281, causing the pistons in the cylinders 128 and 133 to return to their inner positions at the heads of the cylinders. When the piston of cylinder 128 returns to this inner position, it permits the valve 272 to return to normal or open position, thus discharging compressed air from pipe 271, which allows the piston in the cylinder 40 to return to its normal position. The discharge of air from the pipe 271 also relieves the pressure on the diaphragm valve 275 and releases pressure from the pipe 276 leading to cylinder 150 and admits liquid under pressure to the pipe 290, thus causing the piston in cylinder 150 to move to the left in Fig. 14, thus returning the latch 161 and dog 168 to positions to engage other teeth of their ratchet mechanisms, ready to again advance the turret and spider. The cycle of operations may then be repeated.

The cylinder 115 is actuated by air pressure in the particular construction shown and any suitable means may be provided for controlling the supply of compressed air to this cylinder when a charge holder enters into operative relation to the extruding apparatus. In the construction shown by way of example, the pipe 120 leading to this cylinder may be connected to the pipe 277 through which air passes to the diaphragm valve 281. If desired, the piston 115 could be actuated by liquid under pressure from the liquid valve actuated by the diaphragm valve 281 and which supplies pressure to the pistons 128 and 133. Since the various parts for controlling the sequence of operations of the parts of the machine are all of common construction and can be purchased on the open market and have heretofore been used for similar purposes and other types of machines, they are not herein shown in detail. It may be desirable to use precautionary means to ensure that the operation of the extruding apparatus will not be interrupted by the valve 272 before a full charge of material has been extruded into a charge holder. For this purpose, we have shown in Fig. 14 an electrically operated air valve 295, which valve may be placed into the air pipe 270 in series with the normally open valve 272. The valve 295 is also normally open, but is electrically connected with the circuit of the extruder motor 75, so that the solenoid or magnet in the air valve 295 will close this valve whenever current is being supplied to the motor 75. Consequently, the air pressure will be maintained in the pipe 271 and other pipes connected therewith until both of the valves 272 and 295 are opened, the valve 272 being opened by the piston in the injection cylinder 128, and the electrically operated valve 295 being opened when the supply of current to the extruder motor is interrupted by means of the limit switch 127, and it is, of course, necessary that both of these valves be simultaneously open before air can be exhausted from the pipe 271.

Any other means for insuring the complete filling of the charge holder with the desired amount of material before the operation of the extruder is interrupted may be employed. Any other suitable means may be employed for actuating the various parts of the machine in the proper sequence.

In the use of this machine, the mold housings are closed before they are advanced to the injection position. After the material has been injected into a mold, the clamping pressure on the mold is released and the turret can then be turned to move the mold housings away from the injection position while another mold housing is moved into injection position. The molds, after the material has been injected, are kept under pressure by means of the link mechanisms actuated by the handles 230 and these mold closing mechanisms exert sufficient pressure on the material during the curing or vulcanizing process. This is particularly true in connection with rubber or rubber-like materials which are so viscous that they do not tend to flow out of the mold after the injection pressure is released.

After the mold housings have been on the turret in closed position for a sufficient length of time to cure or vulcanize the molded articles, which may be after they have been moved by the turret halfway or more about the axis of the turret, they are opened manually by the operator by means of the handles 230 at opposite sides of the mold housing and the molded articles are then removed from the molds or dies and the molds or dies are also cleaned to remove any remaining material therefrom. The upper mold housing part is then moved into closed position by means of the link mechanism described and the mold is then ready for another injection.

When it is desired to change the dies or molds, for producing articles of a different kind, it is merely necessary to remove the mold or die plates from the mold housing and replace them with other die plates, and this may be done without removing the mold housings from the turret. If desired, however, the mold housing may readily be removed by first breaking the electrical connections to the heating elements of the mold and then lifting the inner ends of the mold housings to clear the stops or plugs 255, and then moving the mold housings toward the axis of the turret to clear the projecting fingers 251, whereupon the mold housing may be lifted from the turret and replaced by another mold housing.

If for any reason any of the charge holders do not operate properly, for example, due to damage to the same or due to sticking of the plungers, they can readily be removed outwardly from their guides by merely bending the springs 163 out of the way, and the charge holder can immediately be replaced by a spare charge holder. In this manner, charge holders of different capacities may also be easily applied to the spider.

We claim as our invention:

1. In a machine for injection molding plastic materials, the combination of a frame, a mold supported on said frame, an extruding apparatus for discharging plastic material to be molded, a charge holder for receiving a charge of material from said extruding apparatus and including a cylinder which receives said charge and a piston in said cylinder, mechanism for moving said charge holder back and forth into positions adjacent to said extruding apparatus and to said mold, separate mechanism actuated when a charge holder is adjacent to said extruding apparatus for pressing said charge holder against said extruding apparatus to receive a charge of material therefrom and releasing said charge holder for movement to said mold, and a pressure member which forces said piston into said cylinder to eject material from said charge holder and inject the same into said molder when said charge holder is in operative relation to said mold.

2. In a machine for injection molding plastic materials, the combination of a frame, a mold supported on said frame, an extruding apparatus for discharging plastic material to be molded, a charge holder for receiving a charge of material from said extruding apparatus and including a cylinder which receives said charge and a piston in said cylinder, mechanism for moving said charge holder back and forth into positions adjacent to said extruding apparatus and to said mold, separate mechanism actuated when a charge holder is adjacent to said extruding apparatus for pressing said charge holder against said extruding apparatus to receive a charge of material therefrom and releasing said charge holder for movement to said mold, connections for operating said extruding apparatus when said charge holder is pressed against the same and stopping the operation of the extruding apparatus when said charge holder is withdrawn therefrom, and a pressure member which forces said piston into said cylinder to eject material from said charge holder and inject the same into said mold when said charge holder is in operative relation to said mold.

3. A method of injection molding plastic materials, which includes moving a series of charge holders so that one charge holder is in charge receiving position while another charge holder is in injection molding position, successively moving each of a series of molds into injection molding position, forcing a charge of molding material in excess of that required into a charge holder while in charge receiving position, forcing most of the molding material contained in a charge holder into a mold while in injection position, moving each charge holder after injection of material therefrom into another position, and removing from the charge holder while in said other position any molding material remaining in said charge holder.

4. In a machine for injection molding plastic materials, the combination of a turret having a plurality of molds mounted thereon and movable intermittently to successively place the molds thereon into molding position, an extruding apparatus for extruding material to be molded, an intermittently rotatable member having a plurality of charge holders mounted thereon, to move with said rotary member and also relatively thereto, mechanism for imparting intermittent rotary motion to said rotary member to move one of said charge holders into proximity to said extruding apparatus and another charge holder into operative relation to a mold, mechanism for moving said first mentioned charge holder relatively to said rotatable member into charge receiving relation to said extruding apparatus, control mechanism for actuating said extruding apparatus for extruding material to be molded into a charge holder while in charge receiving relation to said extruding apparatus, and means for first moving said charge holders relatively to said rotatable member into injecting relation to a mold and then for forcing the material from said other charge holder into a mold.

5. In a machine for injection molding plastic materials, the combination of a turret having a plurality of molds mounted thereon and movable intermittently to successively place the molds thereon into molding position, an extruding apparatus, a rotary member having a plurality of charge holders mounted thereon to move with said rotary member and also relatively thereto and constructed to simultaneously present one of said charge holders to said extruding apparatus and another charge holder into proximity to a mold on said turret, means for simultaneously rotating said turret and said rotatable member for positioning different molds and charge holders in operative relation to each other, means for extruding material to be molded from said extruding apparatus into a charge holder in operative relation thereto, and mechanism for moving a charge holder positioned in proximity to a mold relatively to said rotary member against a mold and for forcing material from said charge holder into a mold.

6. In a machine for injection molding plastic materials, the combination of a mold an extruding apparatus for discharging plastic material to be molded, a charge holder including a cylinder and a piston, a movable member on which said charge holder is carried for movement between said extruding apparatus and said mold, a guide on said movable member on which said charge holder is movable in the direction of its length, means for moving said charge holder relatively to its guide into operative relation to said extruding apparatus to receive a charge of material to be molded therefrom, means for moving said movable member to place said charge holder into operative relation to said mold, and means for discharging material from said charge holder into said mold.

7. In a machine for injection molding plastic materials, the combination of a mold, an extruding apparatus for discharging plastic material to be molded, a charge holder including a cylinder and a piston, a movable member on which said charge holder is carried for movement between said extruding apparatus and sold mold, a guide on said movable member on which said charge holder is movable in the direction of its length, means for moving said charge holder relatively to its guide into operative relation to said extruding apparatus to receive a charge of material to be molded therefrom, means for moving said movable member to place said charge holder into operative relation to said mold, and means for applying pressure to the piston of said charge holder for discharging material from said charge holder into said mold.

8. In a machine for injection molding plastic materials, the combination of a mold, an extruding apparatus for discharging plastic material to be molded, a charge holder including a cylinder and a piston, a movable member on which said charge holder is carried for movement between said extruding apparatus and said mold, a guide on said movable member on which said charge holder is movable in the direction of its length, means for moving said charge holder relatively to its guide into operative relation to said extruding apparatus to receive a charge of material to be molded therefrom, means for moving said movable member to place said charge holder into operative relation to said mold, and means for applying pressure to the piston of said charge holder for moving said charge holder lengthwise of its guide into operative relation to said mold due to friction between said material and said cylinder, and for moving said piston into said cylinder to discharge material from said charge holder into said mold.

9. An injection molding machine according to claim 7, and including yielding means for urging said charge holder relatively to its guide in a direction away from said mold and said extruding apparatus.

10. In a machine for injection molding plastic materials, the combination of a mold, an extruding apparatus for the material to be molded, a plurality of charge holders for receiving material from said extruding apparatus and discharging the same into said mold, a rotary member on which said charge holders are mounted and which is rotatable to move said charge holders from said extruding apparatus to said mold and having guides for said charge holders in which said charge holders may slide toward and from said extruding apparatus and said mold, means for moving said charge holders one at a time relatively to said guides into operative relation to said extruding apparatus to receive a charge of material therefrom, and a pressure member arranged to apply pressure to said charge holders for moving the same relatively to said guides into operative relation to said mold and for then discharging material from said charge holders into said mold.

11. In a machine for injection molding plastic materials, the combination of a mold, an extruding apparatus for the material to be molded, a charge holder for receiving a charge of material from said extruding apparatus, a movable member on which said charge holder is mounted and which is movable to place said charge holder into operative relation to said extruding apparatus and said mold, a guide on said movable member on which said charge holder is movable toward said extruding apparatus and toward said mold, means for moving said charge holder relatively to said movable member into charge receiving position relatively to said extruding apparatus, and a pressure member mounted to engage said charge holder to move the same relatively to said guide into position in engagement with said mold for the discharge of material into said mold, said charge holder including a cylinder and a piston reciprocable therein, said pressure member acting on said piston and injecting material from said charge holder into said mold.

12. A molding machine according to claim 11, in which said charge holder has a part for guiding the movement of said piston into and out of said cylinder.

13. A molding machine according to claim 11, characterized in that said guide has a portion for limiting movement of said piston outwardly with reference to said cylinder.

14. A machine for injection molding plastic materials, including an extruding apparatus for discharging material to be molded, a charge holder for receiving a charge of material from said extruding apparatus, a movable member on which said charge holder is movably mounted and which moves said charge holder to and from said extruding apparatus and a molding position, a part mounted on said extruding apparatus and a part on said charge holder, said parts moving into proximity to each other when said charge holder is moved to said extruding apparatus, means for actuating said part on said extruding apparatus to move said charge holder relatively to said movable member into engagement with said extruding apparatus to receive a charge of material therefrom and for releasing said charge holder from engagement with said extruding apparatus when a charge of material has been extruded into said charge holder, and means for ejecting material from said charge holder under pressure for molding the same when said charge holder has been moved into molding position.

15. A machine for injection molding plastic materials, including an extruding apparatus for discharging material to be molded, a charge holder for receiving a charge of material from said extruding apparatus, a movable member on which said charge holder is movably mounted and which moves said charge holder to and from proximity to said extruding apparatus and a charge ejecting position, a lever mounted on said extruding apparatus and having a projection, said charge holder having a part movable into operative relation to said projection of said lever when said charge holder has been moved by said movable member into proximity to said extruding apparatus, and means for swinging said lever to move said charge holder into engagement with said extruding apparatus to receive a charge of material therefrom, and for swinging said lever in the opposite direction when said charge holder has received material from said extruding apparatus.

16. A machine for injection molding plastic materials, including an extruding apparatus for discharging material to be molded, a charge holder for receiving a charge of material from said extruding apparatus, a movable member on which said charge holder is movably mounted and which moves said charge holder to and from proximity to said extruding apparatus and a charge ejecting position, a lever mounted on said extruding apparatus and having a projection, said charge holder having a part movable into operative relation to said projection of said lever when said charge holder has been moved by said movable member into proximity to said extruding apparatus, means for swinging said lever to move said charge holder into engagement with said extruding apparatus to receive a charge of material therefrom, and for swinging said lever in the opposite direction when said charge holder has received material from said extruding apparatus, and means actuated by the movement of said charge holder into charge receiving position for causing the operation of said extruding apparatus.

17. A machine for injection molding plastic materials, including an extruding apparatus for discharging material to be molded, a charge holder for receiving a charge of material from said extruding apparatus, a movable member on which said charge holder is movably mounted and which moves said charge holder to and from proximity to said extruding apparatus and a molding position, a lever mounted on said extruding apparatus and having a projection, said charge holder having a part which is moved into operative relation to said projection of said lever when said charge holder has been moved by said movable member into proximity to said extruding apparatus, means for swinging said lever to move said charge holder into engagement with said extruding apparatus to receive a charge of material therefrom, and for swinging said lever in the opposite direction when said charge holder has received material from said extruding apparatus, a motor for operating said extruding apparatus, means actuated by the movement of said lever to place said charge holder into charge receiving position to start the operation of said motor, and means actuated by a charge holder when the required amount of material has been extruded into it for stopping said motor.

18. A machine for injecting plastic materials into a mold, including an extruding apparatus for extruding material to be molded, a charge holder for receiving material from said extruding apparatus, a movable member on which said charge holder is mounted and which moves said charge holder into close proximity to said extruding apparatus and into molding position, said charge holder including a cylinder having an opening into which material is passed into said cylinder by said extruding apparatus and through which material is discharged to a mold, a piston in said cylinder, a guide on said movable member in which said charge holder is movable relatively to said movable member toward and from said extruding apparatus and into molding position, means for yieldingly urging said charge holder relatively to said movable member away from said extruding apparatus and out of said molding position, stop means for limiting the movement of said cylinder in its guide in a direction away from said extruding apparatus and from said molding position, separate means on said guide for limiting the movement of said piston away from said extruding apparatus and from said molding position, means for moving said charge holder relatively to said movable member into operative relation to said extruding apparatus for receiving a charge of material therefrom and for forcing said piston against its stop, and a pressure device for engaging said piston to move the same and said cylinder relatively to said guide into molding position and discharging material from said cylinder for molding the same.

19. In a machine for injection molding plastic materials, the combination of a mold, a charge holder, a movable member on which said charge holder is mounted to move said charge holder back and forth from a charge receiving position to a molding position, said charge holder including a cylinder and a piston reciprocable therein, a guide on said movable member in which said charge holder is mounted to move toward and from a mold, means for placing a charge of material to be molded into said cylinder while in charge receiving position, pressure means for applying pressure to said piston in a direction toward said mold for moving said cylinder due to the friction of material contained therein into operative relation to said mold, and then upon further movement of said piston to inject material from said cylinder of said charge holder into said mold, and yielding means for removing said charge holder out of operative relation to said mold when pressure on said piston is released, to enable said charge holder to clear said mold when moved by said movable member into charge receiving position.

20. In a machine for injecting plastic materials into a mold, the combination of a mold, an extruding device, a charge holder movable into a position to receive a charge of plastic material from said extruding apparatus and into a position in operative relation to said mold to discharge a portion of said material therefrom into said mold, and into a third position, and means in said third position to remove remaining material from said charge holder.

21. In a machine for injecting plastic materials into a mold, the combination of a mold, an extruding device, a charge holder movable into a position to receive a charge of plastic material from said extruding apparatus and into a position in operative relation to said mold to discharge a portion of said material therefrom into said mold, and into a third position, said charge holder including a cylinder and a piston reciprocable therein to force material from said charge holder into a mold, and means in said third position of said charge holder for moving said piston to the end of its stroke in said cylinder for removing remaining material from said charge holder.

22. In a machine for injecting plastic materials into a mold, the combination of a mold, an extruding device, a charge of plastic material holder movable into a position to receive a charge from said extruding apparatus and into a position in operative relation to said mold to discharge a portion of said material therefrom into said mold, and into a third position, said charge holder including a cylinder and a piston reciprocable therein to force material from said charge holder into a mold, means in said third position of said charge holder for moving said piston to the end of its stroke in said cylinder for removing remaining material from said charge holder, said cylinder having a discharge nozzle, and means in said third position for entering said discharge nozzle to remove remaining material therefrom.

23. In a machine for injection molding plastic materials, the combination of a charge holder including a cylinder having a piston mounted to reciprocate therein and having a discharge nozzle, an extruding apparatus for placing a charge of plastic material into said cylinder through said orifice, means for moving said charge holder into another position in which said piston is pressed into said cylinder to discharge a portion of said charge of plastic material from said cylinder into a mold, said charge holder being movable into a third position, means in said third position for pressing said piston to the end of its stroke to remove remaining material from said cylinder, and means in said third position for entering said nozzle to remove remaining material from said nozzle.

24. In a machine for injection molding plastic materials, the combination of a charge holder including a cylinder having a piston mounted to reciprocate therein and having a discharge nozzle, a movable member on which said charge holder is mounted and relatively to which said charge holder is movable to a limited extent in the direction of its length, means for injecting a charge of material to be molded into said charge holder through said nozzle, means for injecting material from said charge holder to said mold and including a pressure device for moving said piston into said cylinder to force a portion of said charge of material from said cylinder to said mold, said movable member moving said charge holder from said pressure device into a position to remove remaining material from said charge holder, and means for removing remaining material from said charge holder, including a stationary perforate ring through which material may be discharged and having an outwardly extending auger-like projection thereon formed to fit into said discharge nozzle without closing the same, a pressure member for engaging said piston for forcing said cylinder into engagement with said perforate ring and said discharge nozzle about said projection, and then pressing said piston to the end of said cylinder to force said remaining material into said nozzle, some of said remaining material flowing through said nozzle past said projection, and means for withdrawing said charge holder from said ring and projection to cause said projection to remove remaining material from said nozzle.

25. A machine for injecting plastic materials into a mold including a turret having a plurality of molds mounted thereon, a pawl and ratchet mechanism for advancing said turret to place the molds thereon successively into molding position, locking means for holding said turret against movement after advance of the same and for accurately positioning said turret, said locking means including a bolt movable into and out of locking relation to said turret, a reciprocatory member for actuating said pawl and ratchet mechanism, and a part on said reciprocatory member which engages said bolt and moves the same out of its locking position prior to the movement of said reciprocatory member to advance said turret.

26. A machine for molding plastic materials including a frame, a turret rotatably mounted on said frame and having a plurality of molds mounted thereon, each mold comprising two parts, means for applying clamping pressure to said molds while on said turret and while in material receiving position to prevent separation of the parts of said molds during injection of plastic material into the molds, said means including a fixed part against which one mold part bears and a movable pressure member movable into engagement with the other mold part, and a closed loop-shaped part mounted on said frame and extending above and below said turret and operatively connected with and enclosing said fixed part and said movable pressure member and opposing the reaction strains of the clamping pressures without transmitting said strains to said frame.

27. A machine for molding plastic materials, including a plurality of molds movable successively into molding position, clamping means for applying clamping pressure to the parts of the mold to prevent separation of the same during the injection of plastic material into the mold, and including a platen movable into engagement with a part of the mold, a fixed member against which the mold is pressed by said platen, and means for moving said platen toward said mold, including a pair of links having one end of each pivoted to said platen, a stationary cam against which the other ends of said links bear and having cam surfaces extending toward said platen, a movable wedge-shaped cam engaging said other ends of said links to force the same apart and move the same along said stationary cam, and a piston and cylinder, one of which is secured to said platen and the other to said movable cam for moving said other ends of links along said surfaces of said stationary cam for moving said platen toward said mold.

28. In a machine for injection molding plastic materials, the combination of a turret movable intermittently and having a plurality of mold housings mounted thereon which are moved by said turret into and out of injection position, a plurality of latches mounted on said turret, a locking member movably mounted on the machine for engaging said latches for accurately positioning said turret and locking the same, said latches having parts cooperating with parts on the outer ends of said mold housings for accurately positioning said mold housings with reference to said latches on said turret, and means on said turret cooperating with said mold housings for holding said mold housings in engagement with said latch parts.

29. In a machine for injection molding plastic materials, the combination of a turret movable intermittently and having a plurality of mold housings mounted thereon which are moved by said turret into and out of injection position, a plurality of latches mounted on said turret, a locking member movably mounted on the machine for engaging said latches for accurately positioning said turret and locking the same, said latches each having an upwardly extending part formed to cooperate with a part on the outer end of said mold housing for accurately locating said end of said mold housing in correct relation to said latch, and means on said turret registering with a part near the other end of said mold housing and with which said mold housing may be engaged by lowering said other end of the same to said turret, for accurately locating said mold housing on said turret and relatively to said latch.

30. In a machine for injection molding plastic materials, the combination of a plurality of molds movable one at a time into a molding position, an extruding apparatus for extruding material to be molded, an intermittently rotatable member having a plurality of charge holders mounted thereon, means for imparting intermittent rotary motion to said rotary member to move one of said charge holders into operative relation to said extruding apparatus and another charge holder into operative relation to a mold, means for extruding material to be molded into a charge holder in operative relation to said extruding appartus, means for forcing the material from said other charge holder into a mold, and spring means for releasably holding said charge holders in positions on said rotatable member in which said charge holders clear said mold and said extruding apparatus and which may be flexed to permit said charge holders to be removed from said rotary member.

31. In a machine for injection molding plastic materials and having a mold and an extruding apparatus, of a charge holder for receiving a charge of material from said extruding apparatus, a movable member for moving said charge holder to and fro between said extruding apparatus and said mold and on which said charge holder is movably mounted and from which said charge holder may be removed and replaced by another charge holder, a spring for yieldingly holding said charge holder on said movable member and for yieldingly holding said charge holder out of engagement with said mold and said extruding apparatus, and means for moving said charge holder into operative engagement with said mold and said extruding apparatus against the action of said spring.

32. In a machine for injecting plastic material into a mold, the combination of an extruding apparatus for extruding plastic material to be molded, a mold, a charge holder including a cylinder and a piston and movable to and fro between said extruding apparatus and said mold for receiving a charge of material from said extruding apparatus and for delivering the material to said mold, said piston being moved lengthwise of said cylinder by material extruded into said charge holder, and means actuated by said piston during its movement lengthwise of said cylinder for interrupting the operation of said extruding apparatus when said charge holder has received the desired quantity of material.

33. In a machine for injecting plastic material into a mold, the combination of an extruding apparatus for extruding plastic material to be molded, a mold, a charge holder including a cylinder and a piston and movable to and fro between said extruding apparatus and said mold for receiving a charge of material from said extruding apparatus and for delivering the material to said mold, said piston being moved lengthwise of said cylinder by material extruded into said charge holder, a motor for driving said extruding apparatus, and a switch in the circuit of said motor and positioned to be actuated by said lengthwise movement of said piston when said cylinder has received the desired amount of material, to stop said motor.

34. In a machine for injecting plastic material into a mold, the combination of an extruding apparatus for extruding plastic material to be molded, a mold, a charge holder including a cylinder and a piston and movable to and fro between said extruding apparatus and said mold for receiving a charge of material from said extruding apparatus and for delivering the material to said mold, said piston being moved lengthwise of said cylinder by material extruded into said charge holder, a member actuated by said piston during its movement lengthwise of said cylinder for stopping the operation of said extruding apparatus when said cylinder has received the desired amount of material, and means for adjusting said member lengthwise of the path of movement of said piston to vary the amount of material to be received by said cylinder.

35. In a machine for injection molding rubber and rubber-like materials into molds, the combination of a plurality of molds, an extruding apparatus for mixing, kneading and extruding the material to be molded and having a discharge orifice, a charge holder comprising a closed receptacle having a nozzle, a spider on which said charge holder is movably mounted and which is constructed to move said charge holder into a position in proximity to said extruding apparatus and to another position in operative relation to a mold, a pressure member for moving said charge holders one at a time relatively to said spider into charge receiving relation to said orifice of said extruding apparatus to receive a charge of extruded material therefrom under pressure, and another pressure member acting on said holder for forcing material from said holder into a mold with sufficient pressure to force the material into all cavities of said mold.

FRANCIS W. BLANCHARD.
ALFRED C. BORKENHAGEN.

REFERENCES CITED

The following references are of record in the file of this patent:

UNITED STATES PATENTS

| Number | Name | Date |
|---|---|---|
| 534,445 | Miller | Feb. 19, 1895 |
| 859,640 | Bright | July 9, 1907 |
| 1,505,816 | Steele | Aug. 19, 1924 |
| 2,117,400 | Cobb | May 17, 1938 |
| 2,290,129 | Mereland et al. | July 14, 1942 |
| 2,306,965 | Lindstrom et al. | Dec. 29, 1942 |
| 2,309,460 | Lester | Jan. 26, 1943 |
| 2,333,056 | Thoreson et al. | Oct. 26, 1943 |
| 2,351,774 | McGowen | June 20, 1944 |